United States Patent
Buchholz

(10) Patent No.: US 11,779,186 B2
(45) Date of Patent: Oct. 10, 2023

(54) SCUFF-REMOVING PAD

(71) Applicant: Robert M. Buchholz, Aurora, IL (US)

(72) Inventor: Robert M. Buchholz, Aurora, IL (US)

(73) Assignee: Shooz, LLC, West Chicago, IL (US)

( * ) Notice: Subject to any disclaimer, the term of this patent is extended or adjusted under 35 U.S.C. 154(b) by 0 days.

(21) Appl. No.: 15/651,975

(22) Filed: Jul. 17, 2017

(65) Prior Publication Data

US 2018/0125323 A1    May 10, 2018

Related U.S. Application Data

(60) Provisional application No. 62/363,701, filed on Jul. 18, 2016.

(51) Int. Cl.
| | |
|---|---|
| *A47L 13/16* | (2006.01) |
| *B32B 5/02* | (2006.01) |
| *B32B 7/12* | (2006.01) |
| *B32B 27/12* | (2006.01) |
| *B32B 27/30* | (2006.01) |
| *A47L 13/512* | (2006.01) |
| *B32B 37/12* | (2006.01) |
| *B32B 37/18* | (2006.01) |
| *B32B 38/04* | (2006.01) |
| *B32B 38/00* | (2006.01) |

(52) U.S. Cl.
CPC ............. *A47L 13/16* (2013.01); *A47L 13/512* (2013.01); *B32B 5/022* (2013.01); *B32B 7/12* (2013.01); *B32B 27/12* (2013.01); *B32B 27/304* (2013.01); *B32B 37/12* (2013.01); *B32B 37/182* (2013.01); *B32B 38/0004* (2013.01); *B32B 38/04* (2013.01); *B32B 2038/042* (2013.01); *B32B 2432/00* (2013.01)

(58) Field of Classification Search
CPC ................................. A47L 13/16; A47L 25/08
USPC .............................. 15/209.1, 210.1, 228, 231
See application file for complete search history.

(56) References Cited

U.S. PATENT DOCUMENTS

| | | |
|---|---|---|
| 144,674 A | 11/1873 | Horton |
| 885,276 A | 4/1908 | McDonald |
| 3,526,014 A | 7/1968 | Edwards |
| 3,526,917 A | 9/1970 | Haywood, Jr. |
| 3,680,170 A | 8/1972 | Sims |
| 3,699,672 A | 10/1972 | Sims |
| RE29,303 E | 7/1977 | Fraser, Jr. et al. |
| 4,606,782 A * | 8/1986 | Demetriades ......... A47L 11/164 156/62.8 |
| 4,616,828 A | 10/1986 | Haythornthwaite |
| 4,924,608 A | 5/1990 | Mogonye |
| 5,211,788 A | 5/1993 | Song |
| 5,308,060 A | 5/1994 | Nakamura et al. |

(Continued)

*Primary Examiner* — Shay Karls
(74) *Attorney, Agent, or Firm* — Erickson Law Group, PC

(57) ABSTRACT

A scuff-removing pad is provided that includes a piece of vinyl or linoleum sandwiched between two similarly shaped pieces of adhesive backed felt. The materials are pressed together using 15 tons of pressure for maximum adhesive and then die cut to form the shape of the scuff-removing pad. Each pad has a small through hole to allow for the insertion and tying of a tether which is tied at an opposite end to a clip or other device for removable attachment to a custodian's belt. The scuff-removing pad is useful for the custodian to erase scuff marks from vinyl flooring or other solid flooring.

6 Claims, 2 Drawing Sheets

(56) References Cited

U.S. PATENT DOCUMENTS

| | | | |
|---|---|---|---|
| 5,560,067 A * | 10/1996 | Brook | A47L 13/294 |
| | | | 15/104.94 |
| 5,613,897 A | 3/1997 | Thompson, Jr. | |
| 5,830,092 A | 11/1998 | Meeks | |
| 5,836,038 A * | 11/1998 | Thorp | B43L 21/00 |
| | | | 15/209.1 |
| 5,900,068 A | 5/1999 | Thomas | |
| 6,601,264 B1 * | 8/2003 | Hendricks | B60S 3/045 |
| | | | 15/210.1 |
| 6,668,414 B1 | 12/2003 | Benjamin, Jr. | |
| 6,833,034 B1 | 12/2004 | Thomas, Jr. | |
| 8,060,974 B2 * | 11/2011 | McLogan | A43B 3/00 |
| | | | 15/227 |
| 8,578,547 B1 | 11/2013 | Hollenbach | |
| 2004/0019995 A1 | 2/2004 | Kowalski et al. | |
| 2004/0040105 A1 | 3/2004 | Hillenbrand | |
| 2005/0166942 A1 | 8/2005 | Owens | |
| 2005/0166943 A1 * | 8/2005 | Owens | A47L 13/282 |
| | | | 134/6 |
| 2005/0198758 A1 * | 9/2005 | Kunz | A63B 47/04 |
| | | | 15/118 |
| 2006/0207045 A1 | 9/2006 | Pyka et al. | |

\* cited by examiner

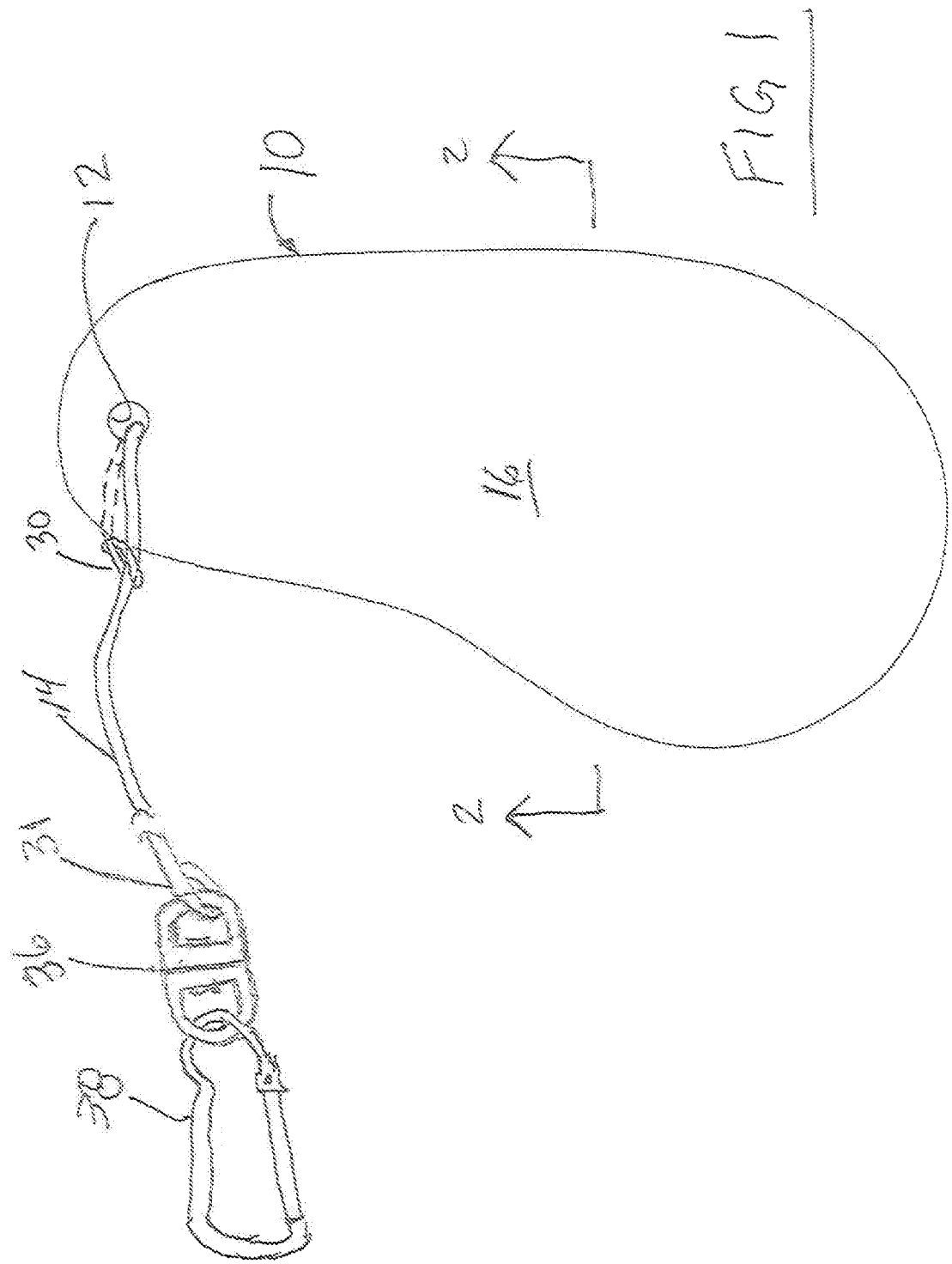

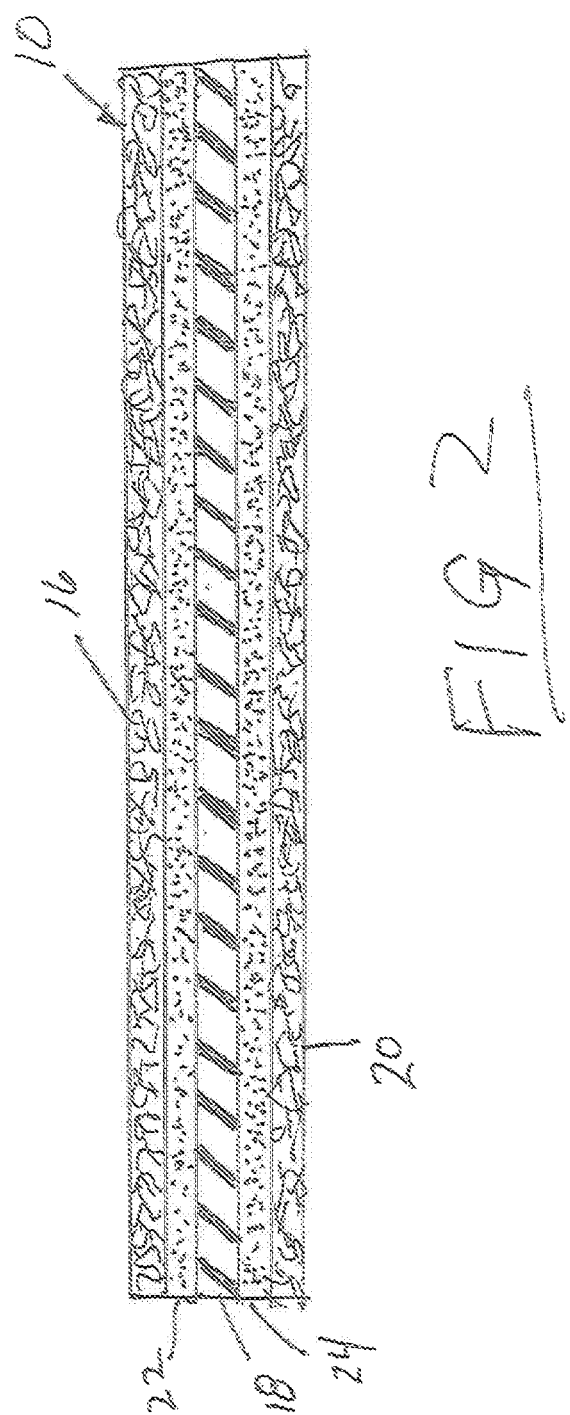

SCUFF-REMOVING PAD

This application claims the benefit of U.S. Ser. No. 62/363,701 filed Jul. 18, 2016.

BACKGROUND OF THE INVENTION

The invention relates to removing shoe scuff marks from vinyl flooring and other solid flooring. Especially on vinyl and linoleum flooring, shoes can leave unsightly black or brown scuff marks. In custodial work, these scuff marks can be difficult to remove by conventional mopping.

It is known to provide scuff removing tools for removing shoe scuff marks. US 2004/0019995A1 and US 2006/0207045A1 describe tools having a pad carried on a handle for removing scuff marks.

The present inventor has recognized that it would be advantageous to provide a scuff-removing pad that is more convenient to carry and to use. The present inventor has recognized that it would be advantageous to provide a scuff-removing pad that does not need a handle. The present inventor has recognized that it would be advantageous to provide a scuff-removing pad that is cost effectively manufactured and is effective in operation.

SUMMARY OF THE INVENTION

The exemplary embodiment of the invention provides a scuff-removing pad that is conveniently carried by the custodian. The pad can be kept in a custodian's pocket and/or tethered to the custodian's belt loop. The pad can be provided with opposing surfaces, each effective to remove scuff marks.

According to the exemplary embodiment, the scuff-removing pad comprises a piece of vinyl or linoleum sandwiched between two similarly shaped pieces of adhesive backed felt. The materials are pressed together using 15 tons of pressure for maximum adhesive and then 'clicked" or die cut to form the final shape of the scuff-removing pad. Each pad can include a small through-cut hole to allow for the insertion of a tether cord, such as a length of twine to be fixed by knotting and finished by cauterization using heat, at both ends. The remaining end is fish tied to a swivel clip and attached to a key ring which is then attached to a carbineer loop.

The tether cord allows the custodian to affix the carbineer to a belt loop and to keep the pad at the ready in their back or front pocket. During floor cleaning, the pad can be at the ready when the custodian comes upon a shoe scuff mark. The custodian can simply remove the pad from the pocket, drop it on the scuff mark, apply pressure with their foot and shoe, and rub the scuff mark off the floor.

There is no need for the custodian to go to the closet for the prior known ball on the stick, or spend excessive time trying to erase the scuff mark from the flooring with the heel of a wet mop. After rubbing of the pad erases the scuff mark off the flooring, the custodian can then just put the pad back into his/her pocket.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 1 is a plan view of a scuff-removing pad according to the invention;

FIG. 2 is a sectional view taken generally along line 2-2 of FIG. 1.

DETAILED DESCRIPTION

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

U.S. Ser. No. 62/363,701, filed Jul. 18, 2016, is herein incorporated by reference.

FIG. 1 shows a scuff-removing pad 10 having approximately the kidney-shape of a shoe sole, although other shapes are also encompassed by the invention. The pad 10 includes a hole 12 for attaching a tether cord 14 to the pad 10.

FIG. 2 shows the pad comprises a first felt layer 16, a base layer 18 and a second felt layer 20. The base layer 18 is advantageously composed of a PVC rubber-like material, or linoleum, although other materials could be used and are encompassed by the invention. The felt layers 16, 20 are advantageously composed of a felt material similar to tennis ball covering material, which is typically composed of wool and nylon fibers. Constructions and compositions of such felt materials are described for example in U.S. Pat. Nos. 5,211,788; RE29,303; 5,308,060; 5,830,092; 4,616,828, herein incorporated by reference.

The felt layers each include an adhesive layer 22, 24. Commercially available felt materials are also provided with an adhesive layer pre-applied and covered by a release layer. The layers 16, 18, 20, 22 and 24 are pressed together with 15 tons of pressure and then "clicked" or die cut to form the pad shape.

Advantageously, the felt layers 16, 20 are coextensive in area with the base layer 18, but it is also encompassed by the invention that the felt layers 16, 20 are less than coextensive with the base layer 18.

Returning to FIG. 1, the tether cord 14 can be threaded through the hole 12 and tied onto itself with a knot 30 to secure the pad to the tether cord. The tether cord 14 can be tied with a knot 31 at an opposite end to a swivel clip 36 and/or a carabineer attachment 38. Thus, the custodian can have the pad connected to his/her belt loop for ease of access to the pad during floor cleaning. Also, the pad is sized to be fit into the custodian's pocket.

In use, the pad is placed on the scuff mark and foot pressure is applied by the custodian's foot and shoe on the pad and the pad is moved by the foot in a rubbing fashion, which erases the scuff mark.

The pad can be shoe sole-shaped to facilitate placement of the shoe onto the pad.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:
1. A scuff-removing pad comprising:
a flexible base layer composed of a rubber-like material; and
a first felt layer adhesively secured to a first side of the base layer, the first felt layer covering the first side of the base layer, wherein the pad has a widthwise dimension to facilitate placement of a shoe onto the pad; and wherein the base layer is composed of a material selected from PVC or linoleum.

2. The pad of claim 1, further comprising a second layer of felt adhesively secured to the base layer on a side opposite the first felt layer.

3. The pad of claim 2 wherein the base layer and the first and second felt layers are coextensive, sharing a common outside perimeter.

4. The pad of claim 3 wherein the outside perimeter is shoe-sole shaped.

5. The pad of claim 4 wherein the base layer includes a hole and further comprising a tether secured to the base layer through the hole.

6. The pad of claim 1, wherein the first felt layer is composed of a felt material having wool and nylon fibers.

* * * * *